United States Patent [19]

Burris

[11] 4,094,696
[45] June 13, 1978

[54] ASPHALT EMULSION PAVING COMPOSITION

[76] Inventor: Michael V. Burris, 723 S. Third St., Las Vegas, Nev. 89101

[21] Appl. No.: 686,733

[22] Filed: May 17, 1976

[51] Int. Cl.$^2$ ............................................. C08L 95/00
[52] U.S. Cl. ................................ 106/277; 106/273 N; 106/278; 106/281 R; 106/283; 252/311.5
[58] Field of Search .................. 106/273 N, 277, 278, 106/280, 281 R, 283; 252/311.5; 404/17, 32

[56] References Cited

U.S. PATENT DOCUMENTS

| 3,036,015 | 5/1962 | Woodward | 106/277 |
|---|---|---|---|
| 3,093,500 | 6/1963 | Jones | 106/280 |
| 3,230,104 | 1/1966 | Falkenberg et al. | 106/281 R |
| 3,276,887 | 10/1966 | Pitchford | 106/277 |
| 3,427,172 | 2/1969 | Roediger et al. | 106/277 |
| 3,738,852 | 6/1973 | Doi et al. | 106/277 |

Primary Examiner—Lorenzo B. Hayes
Assistant Examiner—W. Thompson
Attorney, Agent, or Firm—Seiler & Quirk

[57] ABSTRACT

An improved asphalt emulsion composition comprises an oil phase having minor amounts of gilsonite and naphtha and a major amount of asphalt, and a water phase having water and a small amount of a cationic emulsifying agent, wherein the ratio between the oil and water phases is between about 1:1 and 2:1 by weight respectively, the asphalt having a distillation residue penetration of less than 40 dmm at 77° F (25° C).

9 Claims, No Drawings

ASPHALT EMULSION PAVING COMPOSITION

BACKGROUND OF THE INVENTION

The present invention relates to an improved asphalt emulsion composition providing improved skid resistance. Previously used skid resistance road surfaces have incorporated special high cost aggregates such as chips having a specified number of fracture surfaces. The unique combination of ingredients of the present invention allows the use of much less expensive aggregates or sand and yet achieves an unexpected improvement in skid resistance.

SUMMARY OF THE INVENTION

It has now been found that an extremely useful emulsion composition provides excellent skid resistance without the necessity of incorporating expensive aggregates. The basic composition comprises an asphalt emulsion using a low penetration or "hard pen" asphalt. The composition also preferably contains gilsonite to achieve the advantages of previously known gilsonite containing road surface sealing compositions but without the disadvantages of flammability, rapid solvent evaporation and other undesirable storage and handling characteristics. The composition comprises an oil phase of a minor amount of gilsonite and naphtha, preferably in the approximately equal portions by weight, a major amount of asphalt, and a water phase comprising a small amount of a cationic emulsifier, preferably a quaternary ammonium halide, amine acetate salt or an alkyl-substituted imidazoline, and water, with the oil and water phases preferably being between about 1:1 and 2:1 by weight respectively. The composition is one having a distillate residue penetration (D-244 distillation) of less than 40, and preferably between about 15 and about 35 dmm at 77° F. The composition is easy to prepare and because of its improved skid resistance, handling, and storage or shelf characteristics, makes a superior composition for use as a road surface sealing and coating composition.

DETAILED DESCRIPTION OF THE INVENTION

A critical feature of the asphalt composition of the invention is its low penetration. Specifically the compositions have a distillation residue penetration of less than 40 and preferably between about 15 and 35 dmm at 77° F (25° C), 100g/5sec. The residue is based on the D-402 distillation procedure from either the oil or asphalt phase prior to emulsion preparation or from the D-244 distillation of the emulsion composition itself. These penetration results will be close regardless of which distillation is used because of the highly volatile nature of the naphtha used in preparing the cutback asphalt phase. The penetration figure is based on distillation residue tests according to ASTM D-5 or AASHO T-49, well known to those skilled in the art. In achieving such a low pen asphalt residue, the asphalt phase or oil phase used is one having a viscosity at 140° F (cs) of between about 4,000 and about 20,000, and more preferably between about 5,000 and 15,000. If gilsonite is used, as it is in preferred compositions, the asphalt used will have a viscosity of between about 3,000 and 5,000 poise at 140° F, i.e., an AR-4,000 asphalt. However, if gilsonite is not used, then the asphalt will have a viscosity of between about 8,000 and 12,000 cs at 140° F.

The oil phase of the composition of the invention is prepared by mixing the gilsonite, naphtha and asphalt in the desirable portions. Preferably, the gilsonite ore is blended with the naphtha at elevated temperatures in the range of between about 120° and 150° F. Since gilsonite is a solid material, it is blended until solution has occurred. The naphtha utilized is a petroleum naphtha, and preferably one having a distillation range (ASTM D-86) of between about 90° and about 450° F. Although approximately equal weight proportions of the gilsonite and naphtha are used, pursuant to the invention, a range of ratio of these materials between about 3:1 and about 1:3 by weight, may be utilized. Specific proportions within this range may be selected depending on the amount of gilsonite desired on the surface which will determine road characteristics, color and the like. Again, regardless of the specific ratio, the gilsonite and naphtha are preferably blended at the indicated elevated temperatures until complete solution is achieved.

The asphalt is added to the gilsonite solution. The amount of asphalt blended with the gilsonite-naphtha solution should achieve an asphalt:gilsonite weight ratio of between about 5:1 and about 15:1 and preferably between about 6:1 and about 10:1, respectively. This oil phase of the composition may be produced by simply blending the asphalt into the gilsonite solution in any suitable manner until the composition is substantially homogeneous or the ingredients are otherwise thoroughly blended.

In preparing the emulsion composition of the invention the aqueous or water phase is prepared by mixing an appropriate amount of emulsifier in the water. As previously noted, the emulsifier is present between about 0.1 and about 2% by weight based on the total composition. Since the ratio of oil:water in the final emulsion composition is between about 1:1 and 2:1 the appropriate amount of emulsifying agent to achieve the desired concentrations in the final composition may be easily calculated. The emulsifier used is a cationic emulsifier preferably selected from the group consisting of quaternary ammonium halides, amine acetate salts and alkyl-substituted imidazolines. Quaternary ammonium halides are preferably the chloride salts of the general formula

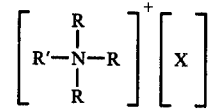

where R' group is a long alkyl chain, of between, for example, 12 and 24 carbon atoms and the remaining R groups are shorter alkyl or benzyl radical in order to impart oil solubility. The X moiety is a halide, preferably chloride or bromide, although other salts such as hydroxide, nitrate, sulfate, acetate and the like may be used. Examples of emulsifiers within this group are as follows:
cetyltrimethylammonium bromide,
cetyldimethylethylammonium bromide,
n-dodecyltrimethylammonium chloride,
n-dodecyltrimethylammonium hydroxide,
n-tetradecyltrimethylammonium chloride,
n-octadecyltri-n-butylammonium nitrate,
n-hexadecyltrimethylammonium chloride,
n-tetracosyltrimethylammonium acetate,
n-docosylpropyldimethylammonium chloride, n-tetradecyl-n-heptyldimethylammonium chloride,
n-heptadecyldipropylmethylammonium chloride,
n-hexadecylethyldimethylammonium chloride,
n-pentadecylbenzyldiethylammonium fluoride,
n-nonadecyldiethylmethylammonium sulphate,
p-diisobutylbenzyltrimethylammonium chloride.
Commercially available compositions of this type include, for example, Hyamine 2389 (methyldodecylbenzyltrimethylammonium chloride), Aliquat 26 (monotallowtrimethylammonium chloride) or Emcol-11, and N-alkylbenzyl N, N, N - trimethyl ammonium chloride with the alkyl group averaging 12 carbon atoms, "Arquad T" and "Arquad S", $C_{14} - C_{18}$ trimethyl ammonium chlorides with the alkyl groups of tallow and soybean oils, respectively.

The amine acetate salt emulsifying agents are the primary aliphatic amine acetate salts sold under the trademark "Armac". These amines are derived from primary, secondary or tertiary amines in which the aliphatic groups are alkyl groups ranging from about 8 to about 18 carbon atoms.

Another preferred group of cationic emulsifiers are the alkyl-substituted imidazolines, wherein one of the alkyl groups has been 12 and 24 carbon atoms and the other substituted alkyl groups have between 1 and 4 carbon atoms. Examples of these emulsifying agents are:
1-(2-aminoethyl)-2(4-tetradecenyl)-4,5-di-n-butyl-2-imidazoline,
1-(2-aminoethyl)-2-n-octadecyl-4-ethyl-2-imidazoline,
1-(2-aminoethyl)-2-n-eicosyl-2-imidazoline,
1-(-2-aminoethyl)-2-(12-heptadecenyl)-2-imidazoline, and
1-(2-aminoethyl)-2-(5,7-heptadecadienyl)-2-imidazoline
Commercial products of this type are "Nalcamines" and "Nalquats" such as Nalcamine CAE, a mixture of 1-(2-aminoethyl)-2-n-aliphatic-2 imidazolines where the aliphatic groups are heptadecenyl and heptadecadienyl. Other cationic emulsifiers may be used such as salts of primary aliphatic amines sold as "Armeens".

Preferably, the aqueous phase will have a pH of between about 4 and about 6 and preferably between about 4 and 5.5. This may be prepared by adding a sufficient amount of acid, preferably HCl. The acid may be added with the cationic emulsifier, or preferably after the emulsifier has been dissolved in the water. The gilsonite-asphalt oil phase and water phase are then simply blended until thoroughly mixed. Preferably, the two phases are heated somewhat prior to mixing and blending in order to further assist the emulsion preparation. For example, the oil phase may be heated above about 200° F and up to, for example, 280° F. At the same time, the aqueous emulsifier composition may be heated up above about 150° and, for example, up to about 200° F. The two phases are then blended until substantial homogeniety is obtained.

Preferred emulsion product specifications are as follows:

| | |
|---|---|
| Viscosity at 77° F, SSF | 20 –100 |
| Settlement, 5 days, % | 5 max |
| Particle Charge | positive |
| Sieve Test | 0.1 max |
| Distillation: | |
| Oil distillate, by volume of Emulsion | 12 max |
| Residue, % | 55 min |
| Tests on Residue: | |
| Penetration at 77° F, 100g/sec, dmm | 15 –35 |
| Softening Point, ° F | 130 min |
| Viscosity at 140° F, poises | 8,000 –12,000 |
| Viscosity at 275° F, cs | 550 min |

EXAMPLE

The following composition was prepared to illustrate the emulsion of the invention, its properties and preparation as well as its advantages over nonemulsion compositions of this type.

A cutback of gilsonite was prepared by mixing equal amounts by weight gilsonite and 57° API naphtha. The specific gravity of the gilsonite and naphtha at 60° F were 1.022 and 0.750 respectively. These materials were mixed so as to give a 50:50 blend of the gilsonite and naphtha. The naphtha was heated to 140°–150° F and the gilsonite was added and mixed until solution was complete. Into this solution was blended AR-4000 asphalt to yield an 8:1 weight ratio of asphalt to gilsonite. The resulting composition had a viscosity of 9700 cs at 140° F and an API gravity at 60° of 10.1. The tests on residue from a D-402 distillation were:

| | |
|---|---|
| Penetration at 77° F, 100g, 5sec, dmm | 21 |
| Softening point, ° F | 136 |
| Viscosity at 140° F, poises | 10,900 |
| Viscosity at 275° F, cs | 645 |

A cationic emulsifier Armak E-5 dodecyl triethyl ammonium chloride was mixed in water to obtain a 1% by weight emulsifier in the final composition. The aqueous solution was acidified with 30% HCL to achieve a pH of between 4 and 5.5. The oil phase was heated to about between 210° and 220° F while the emulsifier solution was heated to about 170° F. The oil and water phases were then combined to achieve a composition having a final temperature of 190° F with the weight percentages set forth as follows:

| Formulation | Wt., % |
|---|---|
| Asphalt | 49.8 |
| Gilsonite | 6.2 |
| Naphtha, 57 API | 6.2 |
| Armak E-5 | 1.0 |
| Water | 37.8 |
| HCL, 30% | Trace |

The composition had the following specifications:

| | |
|---|---|
| Viscosity at 77° F, SSF | 31 |
| Settlement, 5 days, % | −5 |
| Particle Charge | positive |
| Sieve Test | −0.1 |
| Distillation (D-244): | |
| Oil Distillate, By volume Of Emulsion | 9.5 |
| Residue, % | 56 |
| Tests on Residue: | |
| Penetration at 77° F, 100g/sec, dmm | 24 |
| Softening Point, ° F | 134 |
| Viscosity at 140° F, poises | 9900 |
| Viscosity at 275° F, cs | 640 |

The product was applied on the surface of a section of asphalt highway pavement at the rate of 0.1 gal./sq. yd. after which washed concrete aggregate meeting New Mexico highway department specifications was spread on the emulsion at the rate of 6-10 lbs./sq.yd. The surface was tested for skid resistance and it was found that the skid resistance was improved up to three times over the untreated pavement surface.

In another test the above composition was applied to an asphalt road surface as were an MC 800 sand seal composition and a slurry seal. Washed concrete aggregate was spread on both the instant and sand seal compositions at the same rate indicated above while in the slurry seal the aggregate was mixed with the emulsion prior to road application. The sand seal is an asphalt having a distillation (D-402) residue penetration of between 120 (min) and 250 (max) based on ASTM D-5 and AASHO T-49 tests at 77° F while the slurry seal is an emulsion incorporating an asphalt having a corresponding distillation (D-244) residue penetration of between 40 (min) and 90 (max). In a comparison test, wet friction tests were made using tentative ASTM standards at 40 MPH with the surfaces wetted immediately in front of the skid trailer wheels. The skid trailer ("Mu-Meter") measures the side force friction coefficient between the pavement surface and the trailer tires as it is pulled over the test surface. The higher the number, the greater the skid resistance. The composition of the invention having the above described specifications had a friction or skid resistance of 71, the sand seal 42, and the slurry seal 54. The tests show that the composition of the invention, when compared to other asphalt compositions mixed with the same aggregates, exhibited superior skid resistance.

The emulsion composition of the invention exhibits a very stable shelf life and may be stored for long periods without breakdown. At the same time, the composition is easily handled without danger of burning or significant loss of hydrocarbon volatiles which would otherwise render the composition unsuitable. Moreover, they may be used and mixed with any type or size of aggregate desired or specified for an asphalt paving or coating surface. These as well as other advantages will be evident to those skilled in the art.

I claim:

1. An asphalt emulsion composition consisting essentially of:
   an oil phase having between about 5 and about 15 parts by weight gilsonite, between about 5 and about 15 parts by weight naphtha and between about 70 and about 90 parts by weight asphalt and having a residue from distillation penetration less than 40 dmm at 77° F, between about 0.1 and about 2% of a cationic emulsifying agent, and water, the ratio of oil;water being between about 1;1 and 2;1 by weight, respectively.

2. The composition of claim 1 wherein said asphalt has a penetration of between about 15 and about 35 dmm at 77° F.

3. The composition of claim 1 wherein said emulsifying agent comprises a quaternary ammonium halide.

4. The composition of claim 1 wherein said emulsifying agent comprises an amine acetate salt.

5. The composition of claim 3 wherein said salt comprises an alkyl amine salt wherein each said alkyl group has between about 8 and 18 carbon atoms.

6. The composition of claim 1 wherein said emulsifying agent comprises an alkyl-substituted imidazoline.

7. A skid resistant road coating of composition consisting essentially of the composition of claim 1 and aggregate.

8. The composition of claim 7 wherein said aggregate comprises sand.

9. A method of improving skid resistance of a paved surface comprising applying the composition of claim 1 to said surface and spreading sand thereon.

* * * * *